Nov. 28, 1967   F. E. WHITE, JR   3,355,292
CINEMATOGRAPHIC PROCESS
Filed Aug. 13, 1962
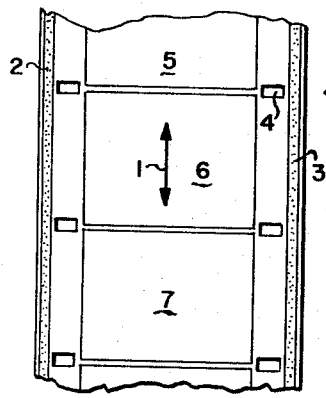
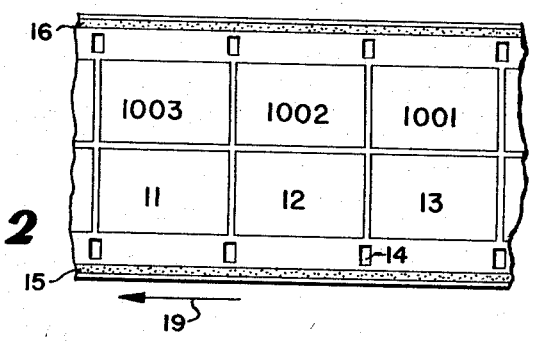
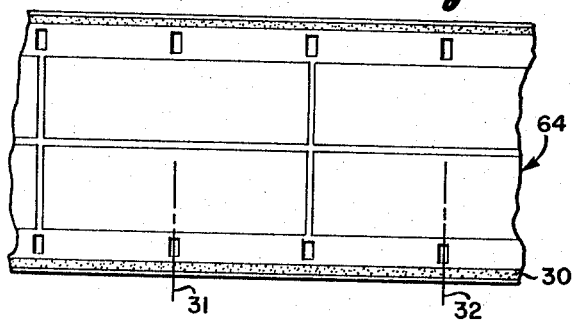
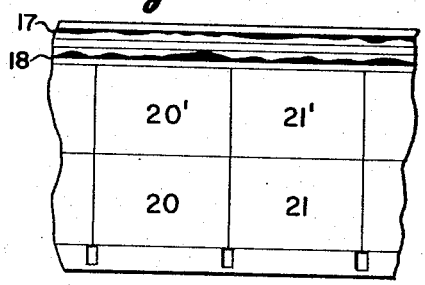
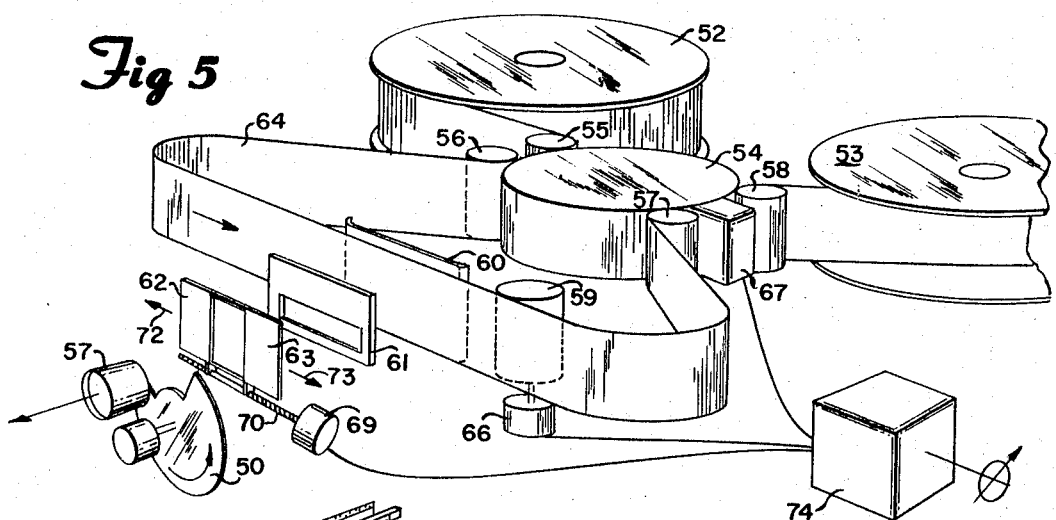
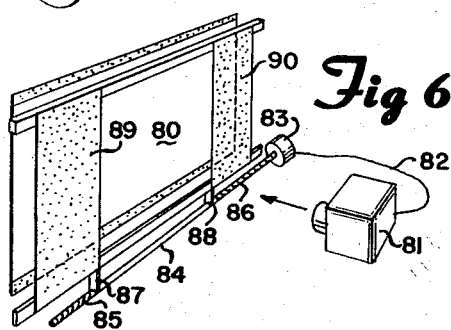
FLOYD E. WHITE JR.
INVENTOR.
BY R. E. Geougue
ATTORNEY

3,355,292
CINEMATOGRAPHIC PROCESS
Floyd E. White, Jr., 3008 Verdugo Road, 4,
Los Angeles, Calif. 90065
Filed Aug. 13, 1962, Ser. No. 216,669
5 Claims. (Cl. 96—39)

This invention relates to improvements in cinematographic processes and more particularly to means and methods for optimizing available image area on a continuous motion picture film strip to effect an economy in the amount of film necessary for a given purpose, as compared with prior methods.

Prior to the making of the present invention, a number of separate cinematographic methods and standards existed for producing motion pictures. Each method or standard involved physical dimensions of the image frame considered optimum for a particular one of many diverse applications. Until 1952, the motion picture industry as a whole used film and equipment that was well standardized. Professional cinematography used a film which was 35 millimeters wide and by international agreement has been fixed as standard. The aspect ratio for this film was 1.33 to 1, and the camera had a four-perforation pull-down mechanism. These specifications have been in effect since early in the twentieth century. Consequently, all cameras, processing machinery and projectors throughout the world, dealing with professional films, are designed for this standard film size. Since the advent of sound in 1926, standard camera speed has been 24 frames per second and most sound tracks have been reproduced optically. Since 1952, however, many new processes have been introduced which depart from these specifications and have introduced a multiplicity of film sizes, aspect ratios, and types of sound tracks. Some processes which continue to require 35-millimeter film use either a means of getting more pictures on the film or use multiple strips of 35-millimeter film projected to form a single large picture. Four-track, six-track, and even seven-track magnetic sound have become fairly common. The motion picture industry has been changed to a larger extent in the years from 1952 to 1960 than in any other time since 1926. However, these changes in standards have been directed principally to professional film as used for exhibition in theaters. The advantages and techniques of these various theatrical standards have not been applied to the home or educational use. Nor has it been feasible to provide commercial feature films or "photoplays" of the type exhibited in theaters to the home user without entailing an unwieldy amount of film and an inordinate number of reel changes during projection.

For reasons of economy and convenience (professional equipment is very expensive, bulky and heavy) smaller film sizes have been developed. These are known as "substandard" films and are generally 16 millimeters or 8 millimeters wide. Of these two sizes the 16-millimeter size offers the greatest flexibility. There is a wide choice of equipment, from inexpensive and simple apparatus to elaborate instruments with many refinements of the professional camera. Another substandard film is 9.5-millimeter film and is generally used to a limited extent in Europe. This film has a single row of sprocket holes which are positioned along the centerline axis of the film, between adjacent image frames.

The requirements of size and economy dictated the parameters of 8-millimeter film for home use; the requirements of greater resolution, screen brilliance, and sound fidelity dictated 16-millimeter film for educational and industrial use; and, various wide-screen techniques based on 35-millimeter and larger film sizes have been employed for theater use. At the present time, the wide screen with an aspect ratio of 2.50 or 2.35 to 1 is in favor in the industry for professional use.

The present invention utilizes the principal advantages of each of three standard film sizes (8 mm., 16 mm., and wide-screen 35 mm.). Additionally, it encompasses a method of providing a motion picture film which has a running time considerably greater than a standard film of the same physical length without a corresponding reduction in resolution, acutance, or screen brilliance. The novel and improved process of the present invention is particularly directed to arrangements which permit a maximum utilization of commercially available processing and film handling equipment (e.g. developing and printing) without entailing modifications thereof and which does not require the use of non-standard sprockets, film perforations, etc. In all respects, the method of the present invention permits the utilization of commercially available, standard film, yet provides great flexibility to obtain the advantages of a number of film standards.

As stated above, the film size generally used in educational institutions, homes and industrial applications is either 8 millimeters or 16 millimeters in width. An advantage of 8-millimeter film which has led to its widespread popularity for home motion pictures is its significantly lower film cost as compared with larger film sizes and its compactness as regards both the film and the equipment therefor. This reduction in size is not accompanied by a corresponding decrease in running time for a given length of film, at standard projection frame rates. On the other hand, 16-millimeter film has been used principally in educational institutions and for industrial uses since its image resolution and/or picture quality is substantially better than that obtainable with 8-millimeter film and permits light sources of greater intensity to be used. This difference in quality arises from the fact that the total image area of an 8-millimeter film frame is approximately one-fourth of the total area of a 16-millimeter film frame. Notwithstanding many improvements made in camera and projection equipment, 8-millimeter film is at present considered unsatisfactory for most audio-visual, educational and/or institutional uses. This is particularly so since screen illumination (brightness) and image resolution are both ultimately limited by the area of the image on the film. Apart from considerations of film width or image area, a significant deterrent to the use of commercially produced entertainment films in the home arises from the excessively long lengths of film required to provide a running time compatible with conventional photoplays of the type exhibited in motion picture theaters. For example, one thousand feet of film, exposed at the normal speed of 24 frames per second, and with a four-perforation pull-down, last but slightly longer than 11 minutes. Thus it becomes necessary to make a number of reel changes during the projection of a photoplay. The mere substitution of 8-millimeter sound film for larger sizes does not overcome this limitation. While sound techniques have been applied to 8-millimeter film, the reproduction quality is significantly poorer than that from 16-millimeter film and in many instances is not considered adequate for serious photoplays or musical films. This degradation in quality results not only from the size reduction of the sound track used with 8-millimeter film, but also results from an inherently lower film velocity.

Recognizing the inherent limitations in the 8-millimeter film standard, which precludes its use for quality entertainment in the home, and as educational films in schools and industry—notwithstanding its overall economy—and further recognizing the economic disadvantages of the 16 millimeter film standard—both as regards cost and physical volume—the motion picture industry has contemplated intermediate film standards. For example, these considerations led to the introduction of the above-discussed film having a width of 9.5 millimeters and a single row of centrally aligned sprocket holes positioned between each frame. In certain foreign countries this intermediate film standard has been adopted. The acceptance of intermediate standards has been disappointing since it involves the obsolescence of vast investments in existing equipment, both in film manufacture and in film processing.

According to the present invention there is provided a novel and improved cinematographic process which incorporates the best features of both 8 millimeter film and 16 millimeter film standards, yet is fully compatible with existing film manufacturing and processing methods and equipment. And, as will become apparent, many additional advantages accrue as a result of the present invention which are not obtainable with either of the prior standards. More particularly, the present method provides an image frame area which is approximately twice the area of standard 8 millimeter image frames thereby providing resolution and picture quality which is highly acceptable for home and educational use, and is in all respects superior to 8 millimeter quality. Furthermore, it retains the sound track velocity of standard 16 millimeter practice, thus assuring acceptable sound reproduction. Also, the present method makes possible a doubling of the running time of a given length of 16 millimeter film, as compared with standard 16 millimeter practice. The film method is compatible with standard 16 millimeter film manufacturing and processing equipment in all respects and provides as an additional advantage means for providing a continuously variable aspect ratio of the image frame as may be desired for special effects. This latter feature is not practical with existing 8 millimeter or 16 millimeter film standards. Wide-screen effects heretofore available only in 35 millimeter or larger film sizes, are achieved with commercially available 16 millimeter film stock in accordance with the present invention.

These desiderata are obtained by (1) utilizing standard 16 millimeter film as an image and sound carrier; (2) transporting the film horizontally rather than vertically; (3) exposing two adjacent ranks of sequential images on the film, one of which is inverted with respect to the other and each image frame of which has an area approximately twice that of a standard 8 millimeter frame; (4) recording multiple sound tracks on the film at standard recording speed which are correlated with the images; (5) processing the film by means of standard 16 millimeter processing equipment; (6) projecting the processed film in a horizontal mode via an aperture having a complementary aspect ratio to that of the image frames on the film; and (7) simultaneously reproducing the recorded sound at standard speed.

It is, therefore, a principal object of the invention to provide a novel and improved cinematographic process for enhancing the utility of motion picture film in which the film is transported horizontally through the film gate.

Another object of the present invention is to provide a novel and improved cinematographic process for producing continuous motion picture films of standard width having images thereon which are accurately registered to standard size perforations of such film, said film being provided with one or more standard speed sound tracks, and having a running time which is significantly greater than the running time of conventionally produced films having the same physical size.

A further object of the invention is to disclose and provide conditions and methods which permit the manufacture of continuous motion picture films in an economical manner from commercially available film stock and by the use of commercially available processing equipment, such film bearing thereon a pair of horizontally disposed series of pictorial images for sequential projection.

Another object of the invention is to provide a novel and improved method of arranging images on motion picture film in two rows, the major axes of which extend in the same direction as the direction in which the film is transported, and which have a "wide-screen" aspect ratio.

A further object of the invention is to provide motion picture films having a dual rank of horizontally disposed, vertically adjacent, images which are adapted for simultaneous projection to permit exhibition of stereoscopic images.

Still another object of the invention is to provide a novel and improved method of producing dual rank motion picture films having horizontally oriented image frames and correlated sound tracks.

Yet another object of the invention is to provide a novel and improved method for substantially increasing the number of image frames available on a given length of standard motion picture film, without reducing the frame rate from the standard speed, and thereby increase the effective running time of the film.

It is yet another object of the invention to provide a cinematographic process for producing motion pictures having a continuously-variable aspect ratio.

Another purpose of the invention is the improvement of cinematography, generally.

Other objects of the invention will in part be obvious and will in part appear hereinafter.

The invention will be understood more completely from the following detailed description, taken in conjunction with the drawings, in which:

FIGURE 1 is a representation of a section of standard 16 millimeter film, bearing a series of consecutive picture areas and images.

FIGURE 2 illustrates a section of standard 16 millimeter film having two rows of perforations and bearing thereon two longitudinally disposed series of images and their corresponding sound tracks, such film resulting from the performance of the method of this invention.

FIGURE 3 is a representation of a section of standard 16 millimeter "optical sound" film produced in accordance with the invention and illustrating the relationship of the image areas and the optical and/or magnetic sound tracks.

FIGURE 4 illustrates a modified form of film produced in accordance with the method herein disclosed, this type of film being particularly adapted to the exhibition of pictures having a continuously-variable aspect ratio.

FIGURE 5 is a simplified schematic diagram of camera apparatus useful in the practice of the cinematographic process of this invention.

FIGURE 6 is a simplified schematic diagram illustrative of apparatus useful in the projection of film produced in accordance with the novel cinematographic process of this invention.

The useful applications of the cinematographic process of this invention are many, one of which being the making of sound films in the form of feature-length photoplays supplied in cartridges or magazines for projection in the home, the specific structure of such cartridge forming the subject matter of a co-pending application of Floyd E. White, Ser. No. 304,107, filed Aug. 23, 1963, now Patent No. 3,319,857.

It is to be understood that inasmuch as the camera and/or projector, per se, do not constitute part of the instant invention, only so much as the structural details and operational features thereof considered to be essential for a complete understanding of this invention are described herein.

Prior systems which departed from standardized film sizes or used non-standard sprocket holes required the replacement of a tremendous monetary investment in processing and projection equipment and thereby failed in commercial exploitation. The present method employs commercially available continuous film provided with standard perforations; the film being of standard dimensional character which may be readily processed in a continuous manner in commercially available equipment; it is adapted for projection equipment which can be manufactured from standardized parts particularly as regards sprockets or standard registration pins and pull-down mechanisms. By the use of specially designed optical systems, stereoscopic pictures may be projected and exhibited. A principal advantage realized by the present process is a substantial increase in runing time. By the use of sealed magazines and projectors especially designed for home and educational use (such magazines and projectors forming the subject matter of the above-mentioned separate application), up to full-length feature motion pictures may be exhibited by persons having no experience with the handling of film and without the necessity of having the film touched by such tyros.

Cinematography as considered hereinafter includes three phase; the taking of the picture with a camera, the processing of the film, and the showing of a picture with a projector. As is well known by those versed in the art, a film produced for projection or a "release print" may actually be obtained by means of printing from a master film or negative rather than by exposing the film in a camera. Therefore, the invention as described hereinafter should not be construed as being limited to an exact means for exposing images onto the film, whether by camera or by printer. The present process encompasses all of these phases and relates more particularly to a novel and improved method or cinematographic process by which images are uniquely oriented on the film to the end that greater economy of film and flexibility of technique apertaining thereto is obtained.

While the preferred practice of the invention is based upon the utilization of standard 16 millimeter motion picture film, and will hereinafter be described as applied to 16 millimeter film stock, it should be understood that the invention is not limited to a particular film width but may be applied to any continuous elongate film strip, greater than or less than, 16 millimeters in width. More particularly, the invention relates to a motion picture film method in which the film is transported horizontally through the camera and the projector, and the base of each image frame is parallel with the edges of the film. Since the photographed image is normally inverted by the optical system in the camera and the projector, the top of each image frame will be parallel to the adjacent edge of the film. The present invention further encompasses the use of two ranks of images on the horizontally transported film, thus doubling the effective length or running time of a given film strip over that obtainable from a single-rank film. Inasmuch as variations in the aspect ratio of motion picture images are usually based upon changes in the apparent width of the images (viz. the image height remains a constant) there is a practical limit imposed on prior vertically-transported film methods by the available image area between the two rows of sprocket holes on the two edges of the film. FIGURE 1 illustrates the standard dimensions and image orientation of 16 millimeter film as used heretofore. The image is vertically oriented as indicated by arrow 1. The maximum width of the image is limited by the transverse distance between sprocket perforations; the camera aperture is specified as being nominally 10.41 millimeters in width. To overcome this limitation anamorphic optical systems have been employed heretofore, to "squeeze" the picture into the available width. By transporting the film horizontally, the height of the image rather than the width of the image becomes limited by the transverse distance between the rows of sprocket holes or the two edges of the film. The nominal height of the camera aperture is specified to be 7.47 millimeters. Since the height of the image is generally given as a constant and the width varied to provide variations in aspect ratio, the present method is not, as a practical matter, limited to any given aspect ratio as an optimum. In fact, the present invention is particularly suited to a continuously-variable aspect ratio, as will appear hereinafter.

Inasmuch as the present invention is primarily concerned with a novel and improved method of utilizing motion picture film the intrinsic properties or type of film is not of limiting importance. That is, the film may be black and white or color, and may be either negative, positive or reversal stock. In order to simplify the teaching of the invention, the following explanation of the process will assume that reversal-type film is being used, since this will produce a film which may be used directly in a projector without the intermediate steps otherwise required in the production of a release print from negative film. It will become obvious to those versed in the art that all types of films may be employed in the practice of the invention.

The aspect ratio of the image is determined by the relative height and width of the aperture in the film gate. The film gate is a passageway through which the film is channeled while it is being exposed in the camera. In a conventional camera the film gate consists of an aperture plate, which is in front of the film and masks the frame or picture; a pressure plate, which is in back of the film and holds it firmly against the aperture plate; and a pair of edge guides, which prevent the film from skewing.

In the prior art the film is advanced through the camera film gate from top to bottom or in a vertical mode. The mechanism for intermittently advancing the film is customarily called a "pull down" since it pulls the film down to the gate of the camera one frame at a time; in a conventional 16 millimeter camera, each frame is one perforation high. In a 35 millimeter camera, each frame is four perforations high. Some wide-screen cameras have perforations five or six perforations high. The pull-down claw engages the perforations in the film and pulls the film down into place to be exposed. At the bottom of its stroke, the claw remains stationary for a moment to position the film, then disengages itself and returns to the upper portion of the stroke to pull another frame into place. During the time that the claw is returning to the top of its stroke, the film is stationary and the shutter opens and exposes the film. Inasmuch as the film is transported horizontally, according to the present invention, the terms "intermittent mechanism" will be used hereinafter in lieu of "pull down."

The picture taken by means of a standard 16 millimeter motion picture camera is masked by the aperture plate, the exact dimensions of which vary according to the camera. The aperture used on 16 millimeter cameras heretofore, is almost the entire width of the film between perforations (or between the single row of perforations and the optical sound track); it is nominally 10.41 millimeters wide and 7.47 millimeters high. This results in a nominal aspect ratio of 1.33:1 (4/3). The corresponding projector aperture is slightly smaller (nominally 9.65 millimeters wide and 7.21 millimeters high). The sound track, whether optical or magnetic, is 26 frames ahead of the picture start. Optical sound film (16 mm.) has only one row of perforations, as shown in FIGURE 3. The space provided by the omitted perforations allows for an optical sound track 1.65 millimeters wide.

According to one modification of the present invention, the aperture plate in the camera has a height equal to approximately one-half of the distance between the rows of perforations (nominally 5.10 millimeters high) and a width defined by the distance between adjacent perforations (nominally 7.47 millimeters). The complementary projector aperture plate is nominally 4.80 millimeters high and 7.20 millimeters wide. This will allow a nominal horizontal image spacing—between adjacent ranks of images—of 0.21 millimeter on the film. The frame-to-frame spacing between adjacent (sequential) images is nominally 0.162 millimeter. These dimensions of the aperture plate opening, when used in conjunction with a horizontally transported film will define an image-bearing area on the film which is approximately twice as large as 8 millimeter film. The nominal aspect ratio will be 1.50:1. By having two adjacent ranks of images—in a manner similar to 8 millimeter stock prior to slitting—the effective running time of the film is doubled.

Particular attention is drawn to the fact that the motion picture film stock employed in the performance of the present process is standard in every respect, readily available, and provided with standard 16 millimeter sprocket perforations (viz. 7.62 millimeter sprocket-to-sprocket spacing). Such film can, therefore, be handled and processed by normal methods using commercially available equipment and does not require specialized film handling apparatus. The film employed may, of course, be of the monochromatic type or may be color film.

When exposed in accordance with the method of the prior art, standard 16 millimeter film (as illustrated in FIGURE 1) will have each image framed by an aperture mask in the camera such as to provide an image area having an aspect ratio of 4/3 (1.33:1) and will have one pair of sprocket perforations for each frame. The perforations of standard 16 millimeter film are 0.072 by 0.050 inch. A pair of magnetic sound tracks 2 and 3 may be located between the edge of the film and the outer edges of the sprocket holes (4) as shown in FIGURE 1. Alternatively, a single optical sound track may be used, in which instance one row of perforations will be omitted, as is well known to those skilled in the art. The longitudinally extending sound track may or may not be carried by the film; in most instances the sound track will be recorded on a separate strip of film or tape in synchronism with the action depicted on the film. The film carrying the picture is developed and processed in the normal manner on standard equipment and may be either negative film stock or reversal film stock, as determined by application requirements. Heretofore, the unexposed film has been transported through the camera, during the taking of the pictures, in a vertical direction progressing from top to bottom as shown in FIGURE 1. That is, frame 5 is exposed, after which frame 6 is exposed, after which frame 7 is exposed, etc. In accordance with the method of the present invention the images are exposed on the film as it moves in a horizontal direction, thus producing an image orientation of the type illustrated in FIGURE 2. Preferably, two adjacent rows of horizontally disposed images are employed. That is, frame 11 is exposed, after which frame 12 is exposed, etc. After one half of the total length of the film has been exposed, the film is inverted and the remaining series of images are exposed upon the film in a reverse direction, as represented by frames 1001–1003 in FIGURE 2.

The sound track for the image series 11–13 is indicated at 15 and may be in the form of a magnetic stripe located between the edge of the film and the outer edges of the film and the outer edges of the perforations (14). Similarly, the sound track for the image series 1001–1003 is indicated at 16.

By employing the aspect ratio hereinbefore stated (nominally 1.50:1), adequate space exists for an optical sound track, if single perforated film of the type shown in FIGURE 3 is to be used. A dual optical track (17 and 18) may be employed in lieu of magnetic tracks. The centerline of one optical track of the pair is spaced 0.635 millimeter from the adjacent guided edge and the other track has its centerline spaced 1.905 millimeters from the adjacent guided edge. The sound tracks 15–16 or 17–18 are displaced with respect to the correlated picture areas in accordance with the characteristics of the projector in which the film is to be shown. Standard 16 millimeter practice requires that the sound track be displaced 26 frames ahead of the picture start, and such practice is entirely compatible with the present invention.

It is to be understood that the series of images 11–13 may concern the same subject matter, plot or story as that depicted in the series indicated at 1001–1003 or each series may concern a different subject or story. In other words, the finished film may either be a full length, coherent presentation of a single subject or story, or it may comprise two or more related subjects, or even unrelated subjects.

During the projection of a film of the type illustrated in FIGURE 2, the projector is arranged so as to project and exhibit the images carried by the series 11–13 and concurrently reproduce sound from the correlated track 15 while the film is being driven from the right to left as indicated by arrow 19. Upon reaching the end of the lower rank of serially aligned images the spools or magazine containing the film may be inverted and the second, adjacent series of images (1001–1003) can then be projected in conjunction with correlated sound track 16, the film again moving in the same direction; namely, from right to left. It will be noted that the base of each image bearing area or frame is parallel with the longitudinal axis of the film, one series of images being in inverted position with respect to the other series.

The film illustrated in FIGURE 3 may contain two series of images which are obtained from simultaneously exposed frames from laterally spaced points of view. In other words, the series 20–21 represent images observed by the right eye or right lens of a camera, whereas the series 20′–21′ may constitute the complementary left eye image. The two ranks of images, therefore, constitute stereoscopic pairs. The images of both series are similarly aligned with their bases parallel to the major axis of the film strip but one series (e.g. 20–21) is not reversed or inverted with respect to the other (e.g. 20′–21′). Only a single correlated sound track, such as 17, may be carried by the film, although the remaining track (18) could be used for stereophonic sound to accompany the stereoscopic images. The film illustrated in FIGURE 3 is, therefore, adaptable for projection in stereoscopic pairs so as to present a continuous motion picture in three dimensions. A split-lens or twin-lens projector is required and suitable polarizing filters or their equivalent are used in the projector and are worn by the observers of the projected images.

Inasmuch as the intermittent mechanism advances the film of the type described in connection with FIGURES 2 and 3, at a standard rate of 24 frames per second with a single-perforation displacement, the velocity of the second track is identical to 16 millimeter standards and special equalization, recording, or playback techniques are obviated. That is, audio equipment, including sound heads, et cetera, for use in connection with the present invention may be of conventional specifications.

There is shown in FIGURE 5 a schematic diagram of a camera suitable for producing films according to another modification of the cinematographic process of the invention. In this modification, motion picture images of continuously variable aspect ratio may be produced. The camera resembles conventional designs of the prior art except that it is oriented so as to transport the film horizontally, and the aperture mask is modified as will appear. The remaining portion of the camera may be of any suitable and well-known construction including a shutter 50 for interrupting the light path during the film advance, and a lens 57. Also provided are the necessary supply and take-up reels (52 and 53, respectively) and the film drive mechanism. The drive mechanism typically may comprise drive sprocket 54 with its pad rollers 55–58, and intermittent sprocket 59. The enclosing housing, the prime mover, and supporting structures have been omitted in the interests of clarity.

The film gate is shown schematically as comprising a two-part aperture plate located in front of a unitary pressure plate 60. The aperture plate comprises a first fixed or stationary mask 61 which defines the top and bottom edges of the image frame and a pair of relatively moveable side mask members 62 and 63 which may be adjusted in a manner to be described more fully hereinafter. For purposes of clarity, mask 61 and side mask members 62–63 are shown in separate planes. However, in a practical construction these members are preferably located in the same plane. This may be accomplished, for example, by having members 62–63 of a suitable height and mounted by means of a tongue-and-groove arrangement in mask 61.

The film 64 is loaded into the camera on supply reel 52 and is threaded over drive sprocket 54 and is thence threaded between idlers or pad rollers 55 and 56. The film 64 is formed into a free loop ahead of the film gate (60–61). The film leaving the film gate moves through a second free loop before again engaging drive sprocket 54 and pad rollers 57 and 58. The film 64 is intermittently advanced through the film gate by means of intermittent sprocket 59 which may, for example, be driven from a Geneva mechanism 66.

It should be understood that the Geneva mechanism 66 may be replaced by a claw type intermittent or other suitable film advancing means, as will be apparent to those versed in the art. After passing from drive sprocket 54 the film 64 is wound onto the take-up spool 53. The take-up spool 53 is suitably coupled to a prime mover (not shown) in order to take up the film.

A recording head 67 is positioned at a point where the film 64 moves at a constant velocity. This location may, for example, be in proximity to the drive sprocket 54, since this moves at a substantially constant speed. The head 67 may be for recording single or dual sound tracks, as required.

Mask 61 is provided with a rectangular aperture 68 which restricts the vertical height of the image exposed on the film to approximately one half of the width of the film 64. The width of the exposed image is defined by mask members 62 and 63 which may be in the plane of 61 and varied by means of servo motor 69 and lead screw 70 to which members 62 and 63 are coupled. Lead screw 70 is divided at the center into two sections having contra-rotating threads. Driving servo motor 69 in a clockwise direction, for example, will cause lead screw 70 to move members 62 and 63 closer together. And, conversely, driving servo motor 69 in a counterclockwise direction will cause members 62 and 63 to move apart in the direction of arrows 72 and 73. The intermittent mechanism (59 and 66) is synchronized with a suitable control means 74 so that when the side mask members 62 and 63 move outward the intermittent stroke or film-advance displacement will be correspondingly increased. That is, the "pull down" stroke will be greater than the standard single perforation stroke. The previously described aspect ratio was nominally 1.50:1, by using this as the minimum aspect ratio and by increasing the intermittent displacement to two perforations, for example, the mask members 62 and 63 may be opened to provide a maximum aspect ratio of 3.00:1. The presently favored wide-screen aspect ratio of 2.50:1 is obviously well within this selectable range.

The control means 74 is also connected with record head 67 in order to place a control signal on a receiving sound track 30 on the film 64 at a point related to the vertical centerline of the image on the film 64. That is, a train of pulses or other suitable control signals are recorded on the sound track 30 extant in the film gate such that the pulse spacing is directly proportional to the spacing between the vertical centerlines 31–32 of adjacent image frames on the film. This pulse train thereafter will be used to control a projection servomechanism in order to mask the projected image in a complementary manner, as will appear. That is, a projection mask is also made variable and is correspondingly adjusted to conform to the aspect ratio of the images on the film. Specific details of this control circuit and the servomechanism used to operate the mask are not contained herein as they are outside the scope of the present invention. Suffice it to say that servo means are provided for varying the mask in the camera and correspondingly varying the mask in the projector or at the projector screen to conform to the horizontal dimension or width of the image frame on the film. A typical projection mechanism, suitable for use with this modification of the invention will now be described briefly.

Looking now at FIGURE 6, there is schematically shown a mask apparatus useful to vary the apparent or effective screen width during projection of films made in accordance with the cinematographic process of the invention described hereinabove in connection with FIGURE 5. Screen 80 is of a width sufficient to accommodate the maximum horizontal width of images produced in accordance with the previously described method (e.g. 3.00:1).

The projection apparatus comprises a projector 81 having a servo-controlled mask, and a screen 80 having an aspect ratio corresponding to the maximum aspect ratio of masks 61–63 in the camera apparatus shown in FIGURE 5. The projection apparatus also includes a pick-up head responsive to the recorded sound track to generate a servo control signal which is coupled, via line 82, to servomotor 83. Servomotor 83 drives a leadscrew 84, having a pair of threaded sections having contra-rotating threads 85–86. Screw followers 87–88 riding on the two contra-rotating threads 85–86 of leadscrew 84 drive screen masks 89 and 90 in a manner required to conform the apparent width of the screen 80 with the apparent width of the image on the film correlated with the control track operating the servomechanism. Apparatus for projection of the film produced by the present method is the subject of a co-pending application of Floyd E. White, Jr. filed Aug. 23, 1963, having Ser. No. 304,023, now Patent No. 3,269,793, and is described in greater detail therein.

Whether the first described modification of the invention relating to a fixed aspect ratio image or the last described modification relating to a variable aspect ratio image is used, the height of the image frame is nominally the same. Assuming that standard 16 millimeter film stock is being used, the centerline of each picture rank is spaced 5.37 millimeters (nominal) from the adjacent guided edge. Heretofore, only one guided edge has been specified for 16 mm. film. That is, the guided edge has been defined as the right-hand edge of positive film as seen with the emulsion side up. However, since the present invention involves two ranks of images, one edge is employed as the guide edge for one image rank and the other edge is employed for the remaining image rank.

There have been illustrated and described the steps of a novel cinematographic process for establishing a film standard intermediate between conventional 8-millimeter and 16-millimeter standards and being readily adapted to encompass the wide-screen techniques of 35-millimeter film, and which is based upon a horizontally transported film strip. Modifications of the invention, in addition to those specifically set forth hereinabove, may be made by those skilled in the art without departing from the intended scope of the invention. For example, the pairs of image ranks (e.g. frame 12 and frame 1002 of FIGURE 2) may comprise separate panoramic views, each for example 90° wide, taken at the same instant in time, and simultaneously projected in side-by-side relationship to provide a 180° wide panoramic mosaic view. This will accommodate super-wide-screen views of the type heretofore obtainable only through the use of two or more simultaneously projected, separate film strips. Other modifications include the use of 35 millimeter film stock in lieu of 16 millimeter stock in order to provide two horizontally disposed ranks of 17.5 millimeter images. Similar scale factors may be applied to other film sizes such as 70 millimeter film stock, et cetera. Since certain changes may be made in the disclosed process without departing from the scope of the invention herein involved, it is intended that all matter contained in the above description or shown in the accompanying drawings shall be interpreted as illus-

What is claimed is:

1. A cinematographic method for the production of motion pictures on a film strip having a continuously variable aspect ratio, comprising the steps of:
intermittently exposing a series of visible images onto a standard motion picture film strip so that the major axis of the image frames extend in the direction of the major axis of the film strip,
masking the film strip during said exposing step to selectively define the area and dimensions of each exposed image frame,
selectively varying the frame-to-frame displacement of the film strip during said exposing and masking steps to correspond to the major linear dimensions of the image frames defined by said masking step, and thereafter
processing the film strip through standard film processing equipment to provide a completed film having visible images thereon.

2. A cinematographic method for the production of motion pictures on a film strip having a continuously variable aspect ratio, comprising the steps of:
intermittently exposing a series of visible images onto a standard motion picture film strip so that the major axis of the image frames extend in the direction of the major axis of the film strip,
masking the film strip during said exposing step to fixedly define the height of each image frame along the transverse axis of the film strip,
selectively masking the film strip during said exposing and height-masking steps to variably define the width of each image frame along the longitudinal axis of the film strip,
selectively varying the frame-to-frame displacement of the film strip during said height-masking and width-masking steps to correspond to the selected image frame width, and thereafter
processing the film strip through standard film processing equipment to provide a completed film having visible images thereon.

3. The method defined in claim 2 including the step of:
recording signals, during said displacement varying step, on a control track on said film strip corresponding to the selected frame-to-frame image displacements.

4. A cinematographic method for the production of motion pictures on a film strip having a continuously variable aspect ratio, comprising the steps of:
intermittently exposing a first series of visible images and thereafter a second series of visible images onto a standard motion picture film strip so that the major axis of the image frames of each series extend in the direction of the major axis of the film strip,
masking the film strip during said exposing steps to fixedly limit the height of each image frame to approximately one half of the transverse dimension of the film strip,
selectively masking the film strip while exposing said first series of images to form said first series of images in adjacent relation on one side of the centerline of said film strip,
selectively varying the width of each image frame of said first series of images along the longitudinal axis of the film strip during said fixed masking and selective masking steps, thereafter
inverting the film strip and exposing said second series of visible images onto the other side of the film in adjacent relation extending in the opposite direction to said first series,
selectively varying the width of each image frame of said second series of images along the longitudinal axis of the film strip during said inverting and exposing step,
selectively varying the frame-to-frame displacement of the film strip during respective ones of said width-varying steps to correspond to selected image frame widths, and thereafter
processing the film strip through standard film processing equipment to provide a completed film having visible images thereon.

5. The method defined in claim 4 including the steps of:
recording signals on a first control track on said film strip during said first-mentioned width-varying step which correspond to the selected frame-to-frame image displacement of said first series of images, and thereafter
recording signals on a second control track on said film strip during said last-mentioned width-varying step, which correspond to the selected frame-to-frame image displacements of said second series of images.

References Cited

UNITED STATES PATENTS

| | | | |
|---|---|---|---|
| 966,342 | 8/1910 | Von Madaler | 352—83 |
| 1,262,954 | 4/1918 | Ives | 352—83 |
| 1,572,863 | 2/1926 | Owens | 352—83 |
| 1,581,834 | 4/1926 | Bouin | 352—234 |
| 1,592,910 | 7/1926 | Stewart | 352—83 |
| 1,785,336 | 12/1930 | Burkhardt | 352—240 |
| 1,858,555 | 4/1932 | Owens | 352—6 |
| 1,866,712 | 7/1932 | Jones | 96—39 |
| 1,915,613 | 6/1933 | O'Neill | 352—27 |
| 2,005,596 | 6/1935 | Scheibell | 88—16 |
| 2,136,486 | 11/1938 | Blondin | 88—16 |
| 2,168,467 | 8/1939 | Blum | 352—23 |
| 2,203,687 | 6/1940 | Land | 96—40 |
| 2,225,620 | 12/1940 | Brown | 88—16 |
| 2,322,489 | 6/1943 | Von Madaler | 352—6 |
| 2,361,390 | 10/1944 | Ferrill | 96—40 |
| 2,735,332 | 2/1956 | Mihalyi | 352—83 |
| 3,115,806 | 12/1963 | Beyer et al. | 96—39 X |

FOREIGN PATENTS

| | | |
|---|---|---|
| 447,543 | 5/1936 | Great Britain. |
| 124,301 | 3/1959 | Russia. |

OTHER REFERENCES

Hill: "International Projectionist," April 1949, p. 20.

NORMAN G. TORCHIN, Primary Examiner.

A. L. LIBERMAN, R. H. SMITH, Assistant Examiners.